United States Patent
Ikeda

(10) Patent No.: US 10,064,222 B2
(45) Date of Patent: Aug. 28, 2018

(54) COMMUNICATION APPARATUS THAT WIRELESSLY COMMUNICATES WITH EXTERNAL APPARATUS, METHOD OF CONTROLLING THE SAME, AND STORAGE MEDIUM

(71) Applicant: CANON KABUSHIKI KAISHA, Tokyo (JP)

(72) Inventor: Kouji Ikeda, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/626,635

(22) Filed: Jun. 19, 2017

(65) Prior Publication Data

US 2017/0367126 A1      Dec. 21, 2017

(30) Foreign Application Priority Data

Jun. 20, 2016 (JP) ................. 2016-121639

(51) Int. Cl.
| | |
|---|---|
| *H04W 76/02* | (2009.01) |
| *H04W 52/02* | (2009.01) |
| *H04N 5/232* | (2006.01) |
| *H04L 12/12* | (2006.01) |

(Continued)

(52) U.S. Cl.
CPC ............ *H04W 76/02* (2013.01); *H04L 12/12* (2013.01); *H04N 5/23203* (2013.01); *H04W 52/0225* (2013.01); *H04W 52/0229* (2013.01); *H04W 52/0251* (2013.01); *H04W 76/10* (2018.02);

(Continued)

(58) Field of Classification Search
CPC .......................... H04W 76/02; H04W 52/0225
See application file for complete search history.

(56) References Cited

U.S. PATENT DOCUMENTS

| | | | |
|---|---|---|---|
| 2007/0211745 A1 | 9/2007 | Deshpande et al. | |
| 2009/0077394 A1* | 3/2009 | Tsai, Jr. ............... | G06F 1/3209 713/310 |
| 2014/0220886 A1* | 8/2014 | Adrangi ............ | H04W 52/0229 455/41.1 |

FOREIGN PATENT DOCUMENTS

JP         2010-193019 A        9/2010

OTHER PUBLICATIONS

The above patent documents were cited in a European Search Report dated Aug. 22, 2017, that issued in the corresponding European Patent Application No. 17176556.3.

* cited by examiner

*Primary Examiner* — Tuan H Nguyen
(74) *Attorney, Agent, or Firm* — Cowan, Liebowitz & Latman, P.C.

(57) ABSTRACT

A communication apparatus capable of achieving both of improvement in operability and suppression of battery consumption. A camera as the communication apparatus wirelessly communicates with one of a plurality of external devices including a remote controller and a smartphone. The state of the camera is switched between an operating state and a power-saving state in which power consumption is smaller than in the operating state. In the power-saving state, when a connection request is received from the remote controller as a device for non-continuous connection, a process for establishing a connection with the remote controller is started, and the camera is shifted to the operating state. In the power-saving state, when a connection request is received from the smartphone as a device for continuous connection, a process for establishing a connection with the smartphone is started, and the camera is not shifted to the operating state.

11 Claims, 11 Drawing Sheets

(51) Int. Cl.
*H04W 76/10* (2018.01)
*H04L 12/28* (2006.01)
(52) U.S. Cl.
CPC ...... *H04L 12/2807* (2013.01); *H04L 12/2816* (2013.01); *Y02D 70/10* (2018.01)

COMMUNICATION APPARATUS THAT WIRELESSLY COMMUNICATES WITH EXTERNAL APPARATUS, METHOD OF CONTROLLING THE SAME, AND STORAGE MEDIUM

BACKGROUND OF THE INVENTION

Field of the Invention

The present invention relates to a communication apparatus that wirelessly communicates with an external device, a method of controlling the same, and a storage medium, and more particularly to a communication apparatus that is remotely operated by an external device.

Description of the Related Art

In general, there has been known a communication apparatus that is remotely operated by a remote controller or the like using a wireless communication standard, such as Wi-Fi, Zigbee, or Bluetooth®.

Image pickup apparatuses, such as a digital camera, include a type which is equipped with a wireless communication function. Therefor, the image pickup apparatus of this type is capable of functioning as an communication apparatus. The image pickup apparatus as the communication apparatus is wirelessly connected to an external device, such as a remote controller or a smartphone, and is thereby controlled by the external device.

Particularly, there is an image pickup apparatus that can be always connected to a smartphone using Bluetooth Low Energy (BLE) which consumes less power. In the case of the image pickup apparatus of this type, even after the image pickup apparatus is automatically shifted to a power-saving state (automatic power-off mode), it is possible to cancel the power-saving state thereof by transmitting an instruction from the smartphone.

Conventionally, to operate an image pickup apparatus by an external device, such as a smartphone, there has been proposed a method of establishing a wireless connection and then transmitting an operation command (instruction) by wireless communication. However, depending on the wireless method, it sometimes takes time to establish a wireless connection, which causes long time to be taken before the image pickup apparatus starts to perform a desired operation.

Conventionally, there has been proposed a communication apparatus that controls power supply based on data (packets) transmitted from a remote place (Japanese Laid-Open Patent Publication (Kokai) No. 2010-193019). In Japanese Laid-Open Patent Publication (Kokai) No. 2010-193019, the communication apparatus determines whether or not a received packet is a request packet for inquiring its own MAC address. Then, if the received packet is a request packet for inquiring its own MAC address (ARP packet), the state of the communication apparatus is changed from the power-saving state to the operating state. The method described in Japanese Laid-Open Patent Publication (Kokai) No. 2010-193019 causes the communication apparatus to start to perform a desired operation more quickly than the method of transmitting an operation command for canceling the power-saving state of the communication apparatus after a wireless connection is established.

However, in the method described in Japanese Laid-Open Patent Publication (Kokai) No. 2010-193019, a wireless connection is not made (a wireless connection is not established) depending on the MAC address included in the response data to the request packet. Further, if the image pickup apparatus is frequently shifted from the power-saving state to the normal state whenever a request packet is received even though the wireless connection is not to be established, power consumption is increased, so that in a case where the communication apparatus is a portable one, battery consumption is increased. That is, the conventional communication apparatus is not only low in operability, but also large in battery consumption.

SUMMARY OF THE INVENTION

The present invention provides a communication apparatus that is capable of achieving both of improvement in operability and suppression of battery consumption, a method of controlling the same, and a storage medium.

In a first aspect of the invention, there is provided a communication apparatus comprising a communication unit configured to wirelessly communicate with one of a plurality of external devices including a first external device and a second external device, and a control unit configured to have a first state for controlling the communication apparatus to a first predetermined state and a second state for controlling the communication apparatus to a second predetermined state in which power consumption of the communication apparatus is smaller than when the control unit is in the first state, wherein in the second state of the control unit, in a case where a connection request is received from the first external device via the communication unit, a process for establishing a connection with the first external device by the communication unit is started, and the control unit shifts to the first state, and wherein in the second state of the control unit, in a case where a connection request is received from the second external device via the communication unit, a process for establishing a connection with the second external device by the communication unit is started, and the control unit does not shift to the first state.

In a second aspect of the invention, there is provided a method of controlling a communication apparatus including a communication unit configured to wirelessly communicate with one of a plurality of external devices including a first external device and a second external device, and a control unit configured to have a first state for controlling the communication apparatus to a first predetermined state and a second state for controlling the communication apparatus to a second predetermined state in which power consumption of the communication apparatus is smaller than when the control unit is in the first state, the method comprising starting, in the second state of the control unit, in a case where a connection request is received from the first external device via the communication unit, a process for establishing a connection with the first external device by the communication unit, and shifting the control unit to the first state, and starting, in the second state of the control unit, in a case where a connection request is received from the second external device via the communication unit, a process for establishing a connection with the second external device by the communication unit, without shifting the control unit to the first state.

In a third aspect of the invention, there is provided a non-transitory computer-readable storage medium storing a computer-executable program for executing a method of controlling a communication apparatus including a communication unit configured to wirelessly communicate with one of a plurality of external devices including a first external device and a second external device, and a control unit configured to have a first state for controlling the communication apparatus to a first predetermined state and a second state for controlling the communication apparatus to a second predetermined state in which power consumption of the communication apparatus is smaller than when the control unit is in the first state, wherein the method comprises starting, in the second state of the control unit, in a case where a connection request is received from the first external device via the communication unit, a process for establishing a connection with the first external device by the communication unit, and shifting the control unit to the first state, and starting, in the second state of the control unit, in a case where a connection request is received from the second external device via the communication unit, a process for establishing a connection with the second external device by the communication unit, without shifting the control unit to the first state.

According to the present invention, it is possible not only to improve the operability of a device as a connection destination, but also to suppress power consumption of the communication apparatus.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1A:
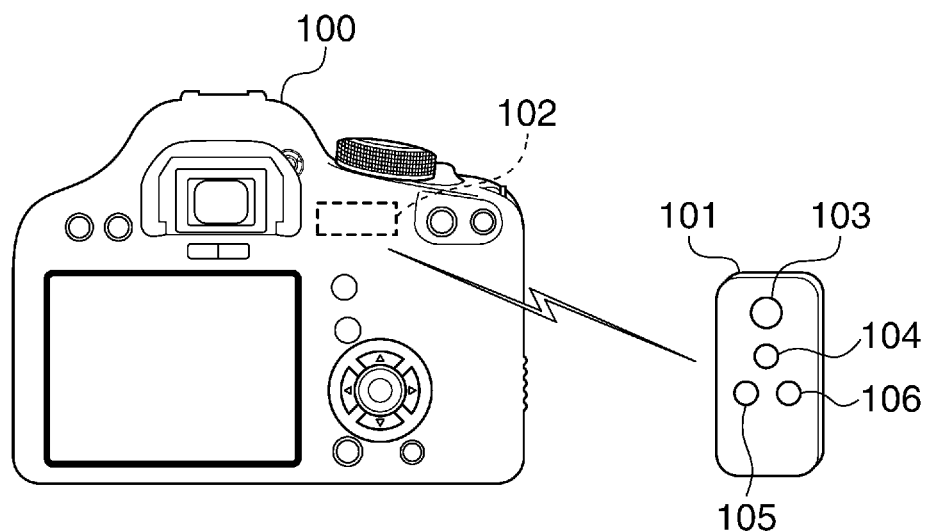
FIG. 1A is a diagram of a digital camera as a communication apparatus according to a first embodiment of the present invention, and an external device (remote controller) as a wireless connection destination.
Figure 1B:
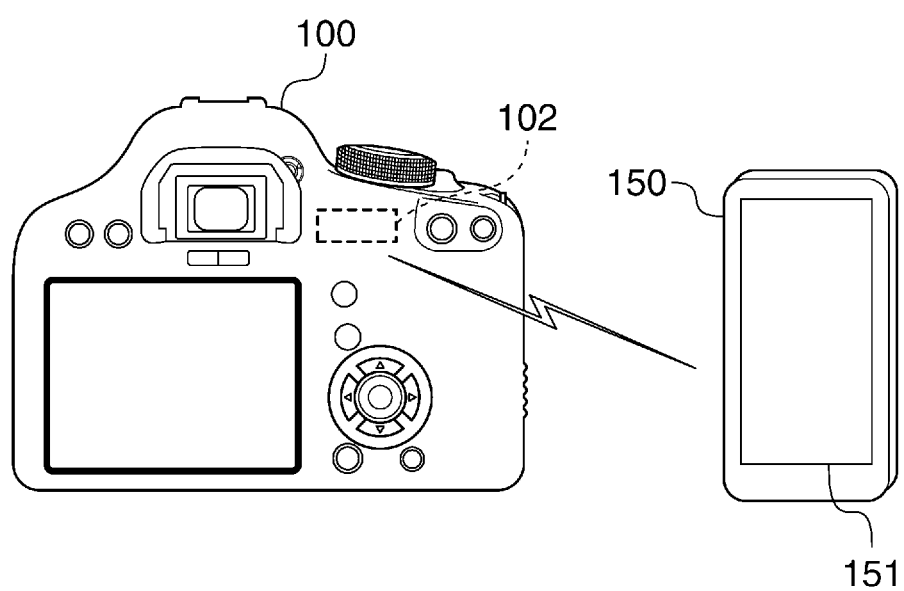
FIG. 1B is a diagram of the digital camera and another external device (smartphone) as a wireless connection destination.

FIGS. 1A and 1B are diagrams each showing a digital camera as a communication apparatus according to a first embodiment of the present invention, and an external device as a wireless connection destination, in which FIG. 1A shows a remote controller as the external device and FIG. 1B shows a mobile terminal as the external device.

First, referring to FIG. 1A, the illustrated communication apparatus is an image pickup apparatus equipped with a wireless communication function. The image pickup apparatus is e.g. a digital camera (hereinafter simply referred to as the camera) 100, and the camera 100 is provided with a wireless communication section 102.

The camera 100 and the remote controller, denoted by reference numeral 101, are connected by a wireless communication system, such as Bluetooth, Bluetooth Low Energy (hereinafter referred to as BLE), Zigbee, or Wi-Fi.

The remote controller 101 is provided with operation members for controlling the camera 100, such as a release button 103, an AF button 104, a first zoom button 105, and a second zoom button 106. Further, although not shown in FIG. 1A, the remote controller 101 is provided with notification members for notifying a user of an operating state of the camera 100, such as an LED display device 253, a buzzer, and a vibration generation device. By using any of these notification members, it is possible to notify the user operating the remote controller 101 of the operating state of the camera 100. That is, even when the user operates the remote controller 101 from a location away from the camera 100, the user can confirm whether or not shooting is successful, by the remote controller 101. Further, the user can confirm whether or not focusing has been performed by automatic focusing (AF), whether or not automatic exposure (AE) is completed, and so forth.

Next, referring to FIG. 1B, in the illustrated example, the camera 100 is connected to a smartphone 150 which is a mobile terminal, by wireless communication. From the smartphone 150, by operating a touch panel as a console section 151, it is possible to view an image recorded in the camera 100, and perform an operation for transferring the image and a remote release operation of the camera 100, by wireless communication.

When a predetermined time period elapses in a state in which the camera 100 is not operated by the user, the camera 100 is shifted to an automatic power-off mode as a second state so as to save power. A time period to elapse before shifting to the automatic power-off mode (i.e. the predetermined time period) can be changed by a user's setting operation. Also in the second state, connection between the camera 100 and the smartphone 150 is maintained, and it is possible to return the camera 100 from the second state to a shooting/reproduction mode as a first state not only by operating a switch on the camera 100, but also by operating the smartphone 150 when the user desires.

Figure 2A:
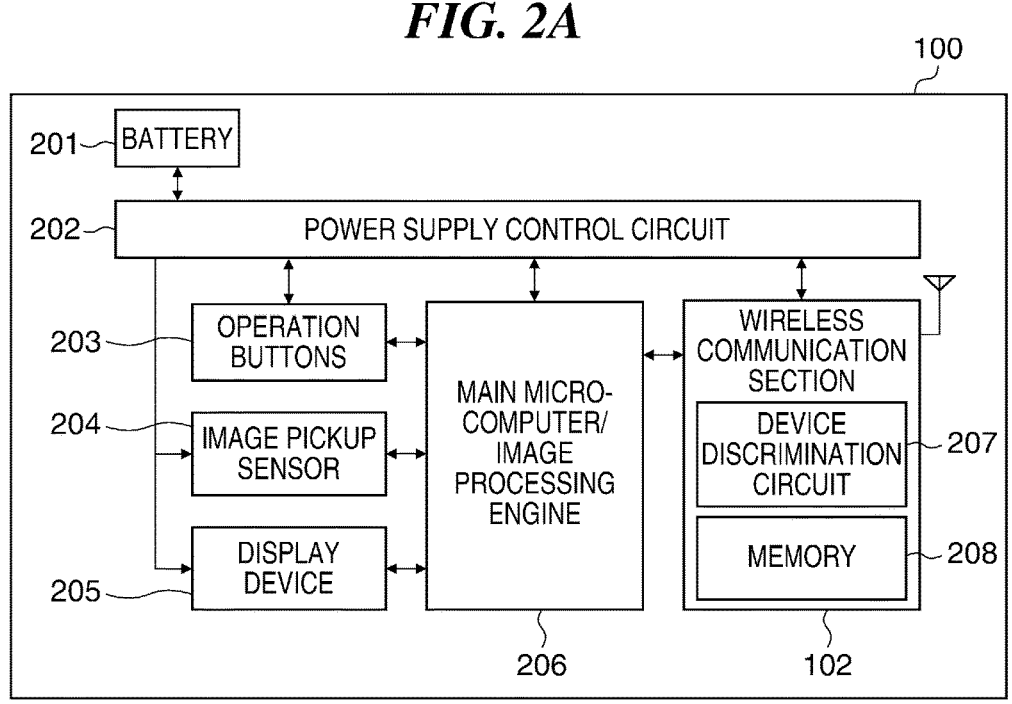
FIG. 2A is a block diagram of the digital camera shown in FIG. 1A.
Figure 2B:
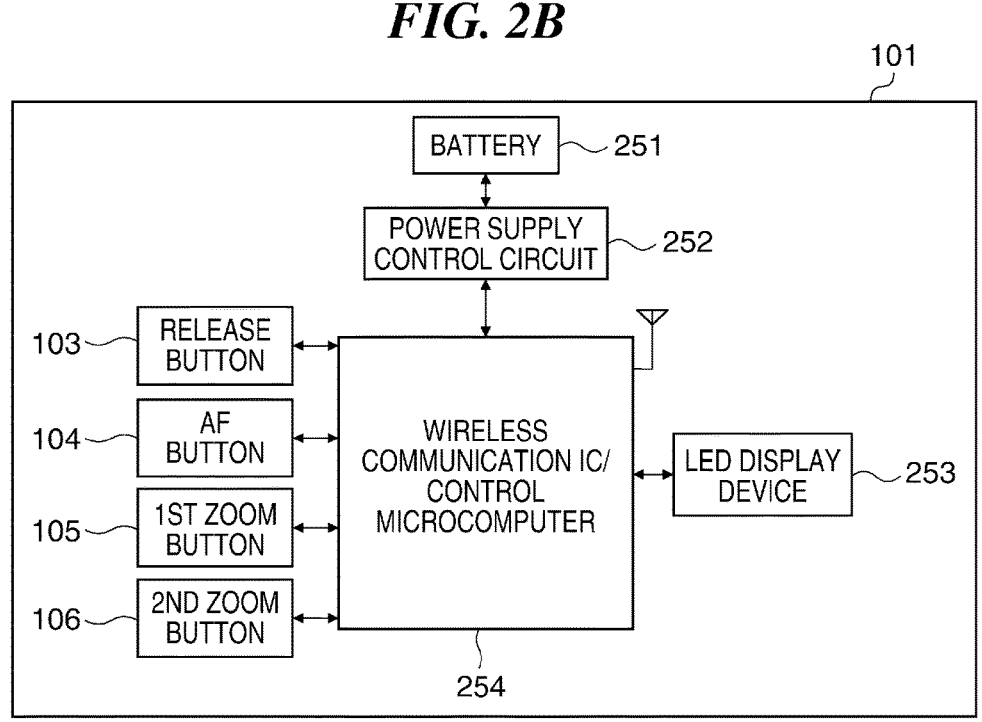
FIG. 2B is a block diagram of the remote controller appearing in FIG. 1A.

FIG. 2A is a block diagram of the camera shown in FIG. 1A. FIG. 2B is a block diagram of the remote controller appearing in FIG. 1A.

First, referring to FIG. 2A, in the camera 100, a power supply control circuit 202 supplies electric power from a battery 201 to blocks of the camera 100. The camera 100 is provided with a plurality of operation buttons, such as a release button, an AF button, a menu button for configuring settings of the camera, and a selection button, as operation buttons 203.

An image pickup sensor 204 and a display device 205 are connected to a main microcomputer/image processing engine 206. The main microcomputer/image processing engine 206 performs control according to the operation of each operation button. For example, the main microcomputer/image processing engine 206 controls the release operation, the AF operation, or the display of images.

Further, the main microcomputer/image processing engine 206 is connected to the wireless communication section 102. The wireless communication section 102 sends a reception signal received by a wireless antenna to the main microcomputer/image processing engine 206. Further, the wireless communication section 102 performs wireless transmission according to the control of the main microcomputer/image processing engine 206.

The wireless communication section 102 includes a device discrimination circuit 207 and a memory 208. The device discrimination circuit 207 discriminates a device address of a connection destination to which the camera 100 is connected. Further, the device discrimination circuit 207 determines whether or not to make a wireless connection, and discriminates the type of the device as the connection destination, based on the device address.

In the memory 208, respective device addresses of connection destinations are registered in advance, and if a device address received from a connection destination is one registered in the memory 208, the device discrimination circuit 207 makes a wireless connection to the connection destination. On the other hand, if the received device address is not registered in the memory 208, the device discrimination circuit 207 does not make a wireless connection to the connection destination. Further, if the received device address is one registered in the memory 208, the device discrimination circuit 207 discriminates the type of the device as the connection destination.

Next, referring to FIG. 2B, in the remote controller 101, a power supply control circuit 252 supplies electric power from a battery 251 to a wireless communication IC/control microcomputer 254. The wireless communication IC/control microcomputer 254 supplies electric power to the LED display device 253 and the buttons 103 to 106.

As shown in FIG. 2B, the release button 103, the AF button 104, the first zoom button 105, the second zoom button 106, and the LED display device 253 are connected to the wireless communication IC/control microcomputer 254. When one of these buttons is operated, the wireless communication IC/control microcomputer 254 wirelessly transmits operation information indicating which of the buttons is operated, to the camera 100. Further, when transmitting operation information by wireless transmission, the wireless communication IC/control microcomputer 254 also transmits a unique device address of the remote controller 101 to the camera 100. Note that the wireless communication IC/control microcomputer 254 is capable of storing an address of a connection destination.

To enable the camera 100 and the remote controller 101 to communicate with each other, it is necessary to perform a pairing operation in advance. The pairing operation refers to an operation performed by each of the camera 100 and the remote controller 101, for registering information on a mating device so as to enable the camera 100 and the remote controller 101 to recognize each other and thereby prevent an erroneous operation even in an environment in which a plurality of devices exist. When the pairing operation is once performed, the camera 100 and the remote controller 101 each hold information on the mating device, and hence in the second and subsequent connection operations, the camera 100 and the remote controller 101 can be automatically connected to each other when the mating device is detected.

When performing the pairing operation, the start of pairing is set on a menu screen of the camera 100. Then, information necessary for the paring operation (paring request) is transmitted from the camera 100 to the remote controller 101. In the remote controller 101, to perform the paring operation, a pairing start button is operated to thereby set the remote controller 101 to a pairing mode. After the remote controller 101 is set to the pairing mode, the remote controller 101 receives the pairing request from the camera 100, and transmits information necessary for the paring operation to the camera 100. Then, when the camera 100 and the remote controller 101 authenticate each other according to a predetermined authentication method, the camera 100 and the remote controller 101 register mating device addresses in respective memories, whereby the pairing operation is completed.

Figure 3:
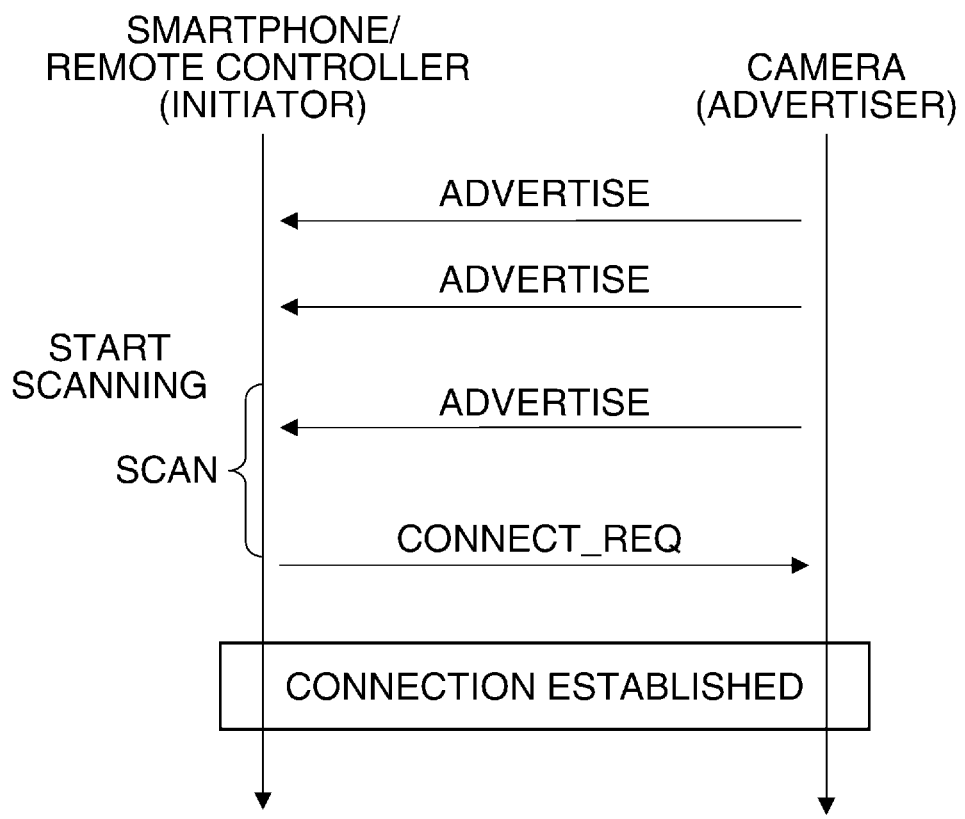
FIG. 3 is a diagram useful in explaining connection between the digital camera and the remote controller or the smartphone, which have been paired with each other.

FIG. 3 is a diagram useful in explaining connection between the camera 100 and the remote controller 101 or the smartphone 150, which have already been paired with each other.

When a user desires to start connection by BLE, the start of connection is set on the menu screen of the camera 100. With this setting, the camera 100 as an advertiser continuously transmits an advertising packet at predetermined time intervals. On the other hand, the remote controller 101 or the smartphone 150 (hereinafter represented by the remote controller) as an initiator starts scanning in response to a button operation for starting connection, which acts as a trigger. The remote controller 101 receives the advertising packet from the camera 100 during a scanning period. The advertising packet includes a predetermined access address, the device address of the camera 100, communication conditions, and so forth.

After receiving the advertising packet, the remote controller 101 transmits a connection request (connect REQ) to the camera 100 as a response. At this time, the remote controller 101 notifies the camera 100 of the device address of the remote controller 101, and communication conditions (a channel, timing, and a window size) for connection.

After receiving the connection request, the camera 100 holds the information, such as the device address of the remote controller 101, and starts communication in synchronism with the remote controller 101 under the communication conditions specified in the connection request. At this time, the remote controller 101 and the camera 100 are shifted to a connected state in which the remote controller 101 is set as a master and the camera 100 is set as a slave, whereby the connection therebetween is established.

After performing the pairing operation, for example, even if communication at synchronized time intervals with the mating device is interrupted, since each mating device has already stored the information on the other, the remote controller 101 can be automatically connected to the camera 100 upon receipt of the advertising packet, without a user's operation.

In the remote controller 101, to reduce power consumption, in a case where the remote controller is not operated, the remote controller 101 stops the wireless connection, and enters a state in which power consumption is suppressed. Then, when the remote controller is operated, the wireless communication IC/control microcomputer 254 is activated and transmits an operation command to the camera 100.

Figure 4:
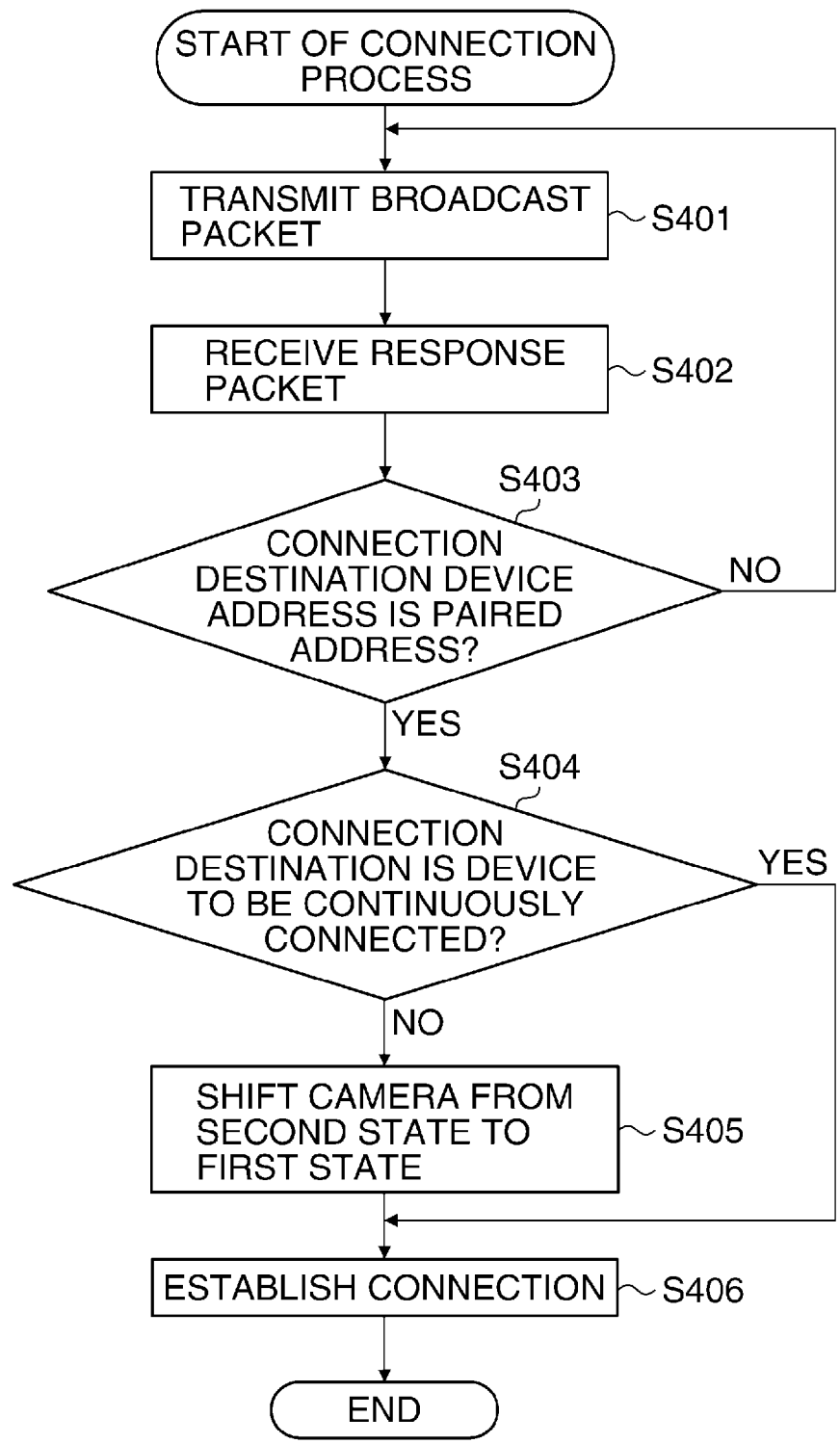
FIG. 4 is a flowchart of a wireless connection process for connecting between the digital camera and a device as a connection destination.

FIG. 4 is a flowchart of a wireless connection process performed by the camera 100, for connecting to a device as a connection destination.

When a wireless connection mode is set in the camera 100, in a step S401, the camera 100 starts transmission of an advertising packet which is communication data transmitted without specifying a transmission destination. In other words, the advertising packet is transmitted as a broadcast packet. That is, the transmission of the advertising packet is broadcast transmission for transmitting communication data including the connection information to an unspecified number of devices without specifying transmission destinations. Then, when the advertising packet is received by a device which is an unspecified connection destination, the device can be connected to the camera 100. Note that in this state, the wireless connection is not established yet.

The camera 100 repeats transmission of the advertising packet until a response is received from a connection destination. However, if the camera 100 is not operated for a predetermined time period in a state in which the advertising packet is being transmitted, the camera 100 may be shifted to the power-saving state as the second state, i.e. the automatic power-off state. In this situation, the remote controller 101 has not been operated, and hence is in a deep sleep state in which power consumption is suppressed.

Figure 5:
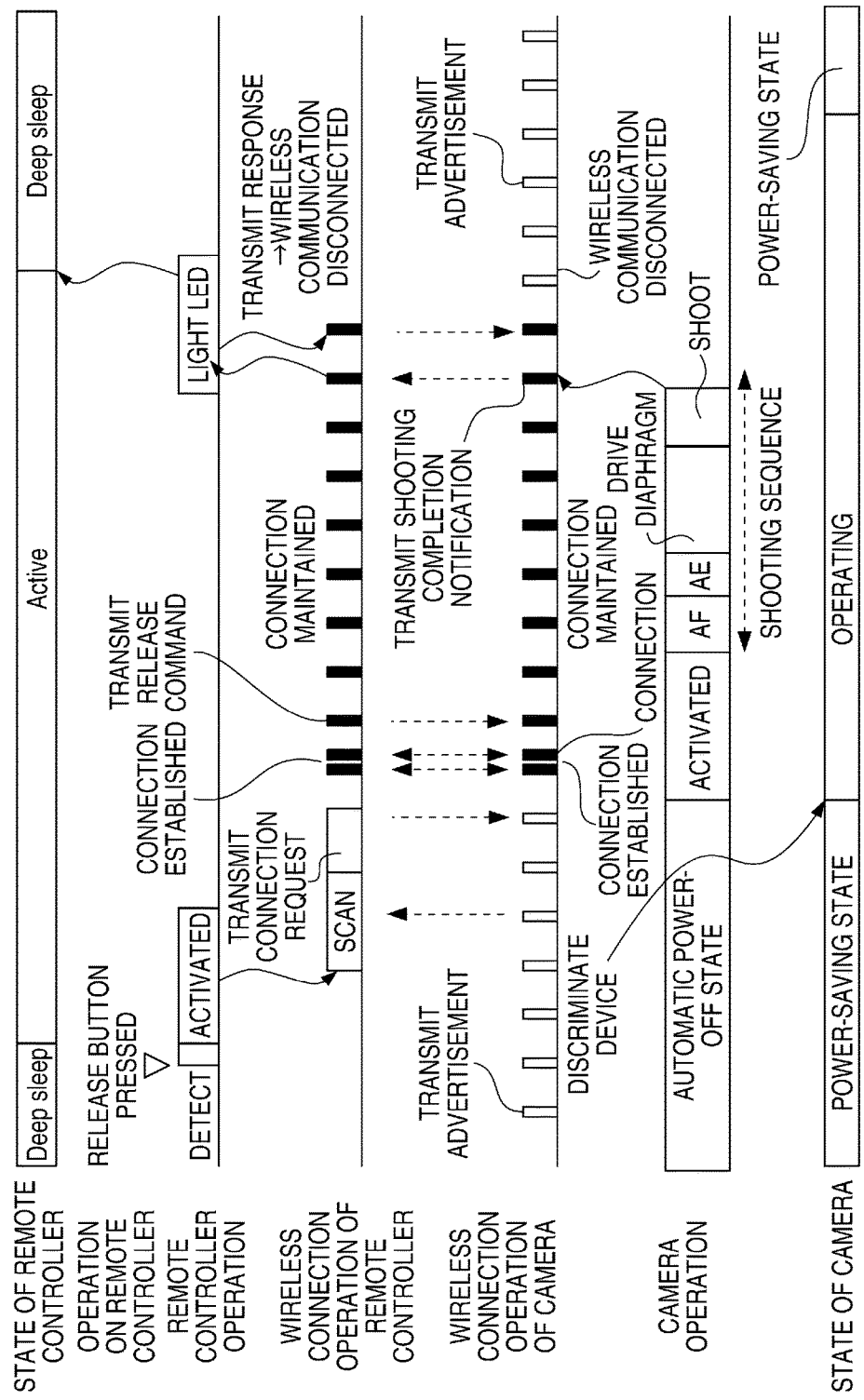
FIG. 5 is a sequence diagram useful in explaining operations of the digital camera and the remote controller.

FIG. 5 is a sequence diagram useful in explaining the operations of the camera 100 and the remote controller 101.

Referring to FIGS. 4 and 5, when the camera 100 is transmitting the advertising packet, the operation of the camera 100 is in the automatic power-off state, and further, the camera 100 is in the power-saving state.

When the release button 103 of the remote controller 101 is pressed in this state, the wireless communication IC/control microcomputer 254 thereof is shifted from the deep sleep state to an active state. After being shifted to the active state, the wireless communication IC/control microcomputer 254 of the remote controller 101 starts scanning, and enters a standby state to perform wireless reception. After the wireless communication IC/control microcomputer 254 starts scanning, when an advertising packet is transmitted from the camera 100, the wireless communication IC/control microcomputer 254 detects the transmitted advertising packet.

If a device address of a transmission source, which is included in the advertising packet, matches any of the device addresses paired in advance, the wireless communication IC/control microcomputer 254 transmits a wireless connection request as a response packet which is response data. Then, in a step S402, the wireless communication section 102 receives the response packet. In a step S403, the wireless communication section 102 reads a device address of a transmission source, which is included in the response packet, and the device discrimination circuit 207 determines whether or not the read device address is a device address which was paired and registered in the memory 208 in advance.

Figure 6:
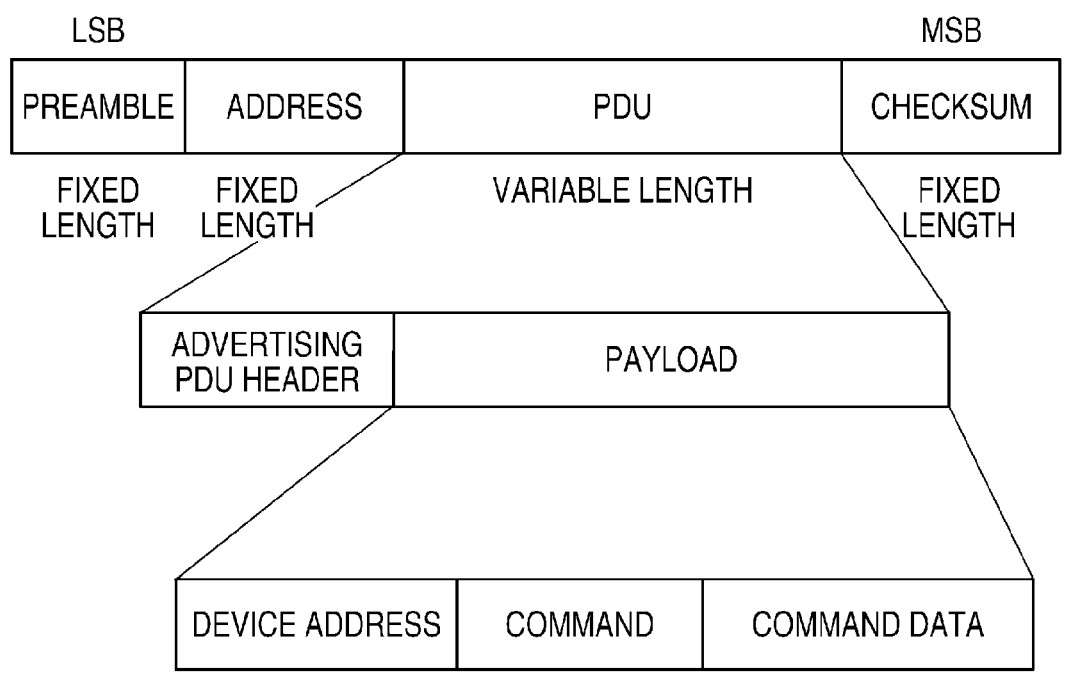
FIG. 6 is a diagram showing an example of a basic structure of a wireless communication packet in wireless communication using BLE.

FIG. 6 is a diagram showing an example of a basic structure of a wireless communication packet in wireless communication using BLE.

A preamble is one byte data used for internal protocol management and is set to four repetitions of digits "10" in the case of the illustrated example, and an address is set to a fixed value for advertising packets. A checksum is used for detecting an error. A protocol data unit (PDU) is different in structure between an advertising packet and a connection packet. Here, the structure of the advertising packet will be described.

The protocol data unit (PDU) has a header and a payload, and a device address and advertising data (e.g. a command and command data) are stored in the payload.

The advertising packet and the response packet both have the above-mentioned structure, and can store a device address in the packet. Note that, in the example described here, the response packet has a payload in which only the device address is stored and no command or command data is stored.

Referring again to FIGS. 4 and 5, if it is determined by the device discrimination circuit 207 in the step S403 that the device address stored in the response packet is not a paired device address, the process returns to the step S401. That is, the wireless communication section 102 ignores the connection request.

If it is determined by the device discrimination circuit 207 in the step S403 that the device address stored in the response packet is a paired device address, the process proceeds to a step S404. In the step S404, the device discrimination circuit 207 discriminates a type of the connection destination (i.e. a type of the device). More specifically, the device discrimination circuit 207 determines whether or not the connection destination is a device to be continuously connected.

As described hereinabove, the remote controller 101 and the camera 100 are paired with each other in advance, and the camera 100 stores the device address of the remote controller 101. This enables, when the received device address matches the paired device address, the device discrimination circuit 207 to determine that the device is the remote controller 101. Note that a plurality of devices may be paired with the camera 100.

If it is determined by the device discrimination circuit 207 in the step S404 that the connection destination is not a device to be continuously connected, the process proceeds to a step S405. Note that, in the example described here, the remote controller 101 is not a device to be continuously connected, and hence in the step S405, the main microcomputer/image processing engine 206 shifts the camera 100 from the second state which is the automatic power-off state to the first state which is the shooting/reproduction mode. That is, the main microcomputer/image processing engine 206 returns the camera 100 from the automatic power-off state to the shooting/reproduction mode.

Then, in a step S406, the main microcomputer/image processing engine 206 cause the wireless communication section 102 to start a connection to the remote controller 101, and transmit and receive connection information, and thereby establishes the connection. Then, the main microcomputer/image processing engine 206 terminates the connection process.

On the other hand, if it is determined by the device discrimination circuit 207 in the step S404 that the connection destination is a device to be continuously connected, the process directly proceeds to the step S406. Note that, in the example described here, the smartphone 150 is a device to be continuously connected. That is, in the case of the smartphone 150, the main microcomputer/image processing engine 206 does not shift the camera 100 from the second state to the first state, but maintains the camera 100 in the automatic power-off state. Then, in the step S406, the main microcomputer/image processing engine 206 controls the wireless communication section 102 to establish the connection to the smartphone 150.

Incidentally, whether or not to shift the camera 100 from the second state to the first state is set to the camera 100 in advance for each type of a connection destination device. For example, to make a quick response to a request from a connection destination according to the function of a device as the connection destination, by shifting the camera 100 from the second state to the first state, it is possible to reduce response time taken for the camera 100, after being activated, to operate.

The type of a connection destination device refers to the type of a device which can be wirelessly connected, such as a remote controller, a smartphone, and a wireless strobe. Further, as mentioned above, whether or not to shift the camera 100 from the second state to the first state is set in the camera 100 in advance for each type of the connection destination device. Note that the setting of whether or not to shift the camera 100 from the second state to the first state may be determined in the following manner: As for a device to which a quick operation response is desirably made by the camera 100 after the connection, the camera 100 is shifted from the second state to the first state. On the other hand, as for a device to which the quick operation response is not desirably made by the camera 100, but in association with which the camera 100 is desirably suppressed in power consumption by being maintained in the second state rather than improved in operation response, the camera 100 is not shifted from the second state to the first state.

When the connection between the camera 100 and the remote controller 101 is established, the main microcomputer/image processing engine 206 receives an operation command indicating that the release button 103 has been operated on the remote controller 101. Upon receipt of this operation command, the main microcomputer/image processing engine 206 executes a shooting sequence. As the shooting sequence, the main microcomputer/image processing engine 206 performs a series of operations, including AF, AE, driving of the diaphragm, and shooting.

When shooting is completed, the main microcomputer/image processing engine 206 causes the wireless communication section 102 to transmit a shooting completion notification to the remote controller 101. Upon receipt of the shooting completion notification, the wireless communication IC/control microcomputer 254 causes the LED to be lit so as to notify the user of completion of shooting. Then, the wireless communication IC/control microcomputer 254 breaks the wireless connection with the camera 100. After that, the wireless communication IC/control microcomputer 254 shifts the remote controller 101 to the deep sleep state. In the camera 100, if a non-operated state of the camera 100 continues for a predetermined time period, the main microcomputer/image processing engine 206 shifts the camera 100 to the power-saving state as the second state, i.e. the automatic power-off state.

Figure 7:
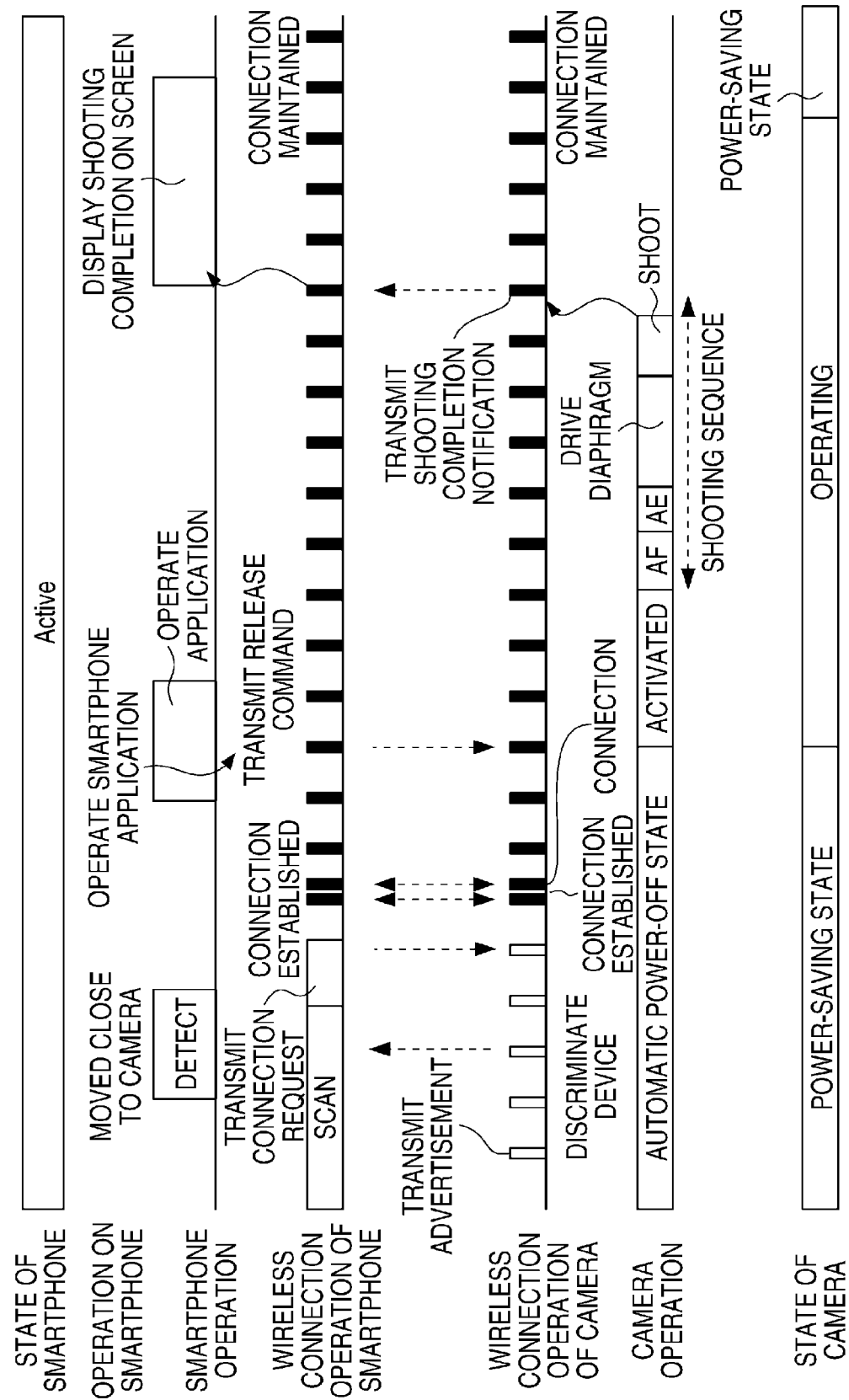
FIG. 7 is a sequence diagram useful in explaining operations of the digital camera and the smartphone.

FIG. 7 is a sequence diagram useful in explaining the operations of the camera and the smartphone. Note that the connection to the smartphone 150 by the camera 100 is performed by the connection process in FIG. 4. Further, a connection process by the smartphone 150 is performed by a controller, not shown.

When the camera 100 is set to the wireless connection mode, the camera 100 starts transmission of an advertising packet which is communication data containing no specified transmission destination. Then, the transmission of the advertising packet by the camera 100 is regularly performed at fixed time intervals. If the camera 100 is not operated for a predetermined time period in this state, the camera 100 is shifted to the power-saving state as the second state, i.e. the automatic power-off state.

The smartphone 150 is not in a wirelessly connected state e.g. because the smartphone 150 is not connected to the camera 100 yet, or is away from the camera 100 at a predetermined distance or more. On the other hand, in the smartphone 150, a wireless communication section (not shown) has been activated, and is in a scanning state in which the smartphone 150 is enabled to receive an advertising packet.

When the smartphone 150 is moved close to the camera 100, and enters a radio's effective range, the smartphone 150 receives the advertising packet irrespective of an operation made on the smartphone 150. If it is determined that the advertising packet is a signal from a paired device, the smartphone 150 transmits a wireless connection request as a response packet. Upon receipt of the response packet as response data, the camera 100 reads a device address included in the response packet, and determines whether or not the device address is a paired device address.

If the smartphone 150 has been paired, the camera 100 performs discrimination of the connected device, and identifies the connected device as the smartphone 150. Since the smartphone 150 is a device to be continuously connected, the camera 100 establishes connection with the smartphone 150 in the second state, i.e. in the automatic power-off state.

After the connection is established, in the smartphone 150, a smartphone application for controlling the camera 100 is started or set to an active state. Then, the smartphone 150 notifies the camera 100 of the state of the smartphone application. Upon receipt of the notification indicating the smartphone application is in the active state, the camera 100 is shifted from the second state to the first state, and enters a standby state waiting to perform an operation corresponding to an operation made on the smartphone 150.

When a button for performing the release operation is operated on the smartphone 150, the smartphone 150 transmits an operation command to the camera 100. Upon receipt of the operation command, the camera 100 starts the shooting sequence. Then, when shooting is completed, the camera 100 transmits a shooting completion notification to the smartphone 150.

Upon receipt of the shooting completion notification, the smartphone 150 displays a screen for notifying the user of completion of shooting. Since the camera 100 and the smartphone 150 are continuously connected to each other by wireless connection, the wireless connection between the camera 100 and the smartphone 150 is maintained. Although the wireless connection is maintained, if a non-operated state of the camera 100 continues for a predetermined time period, the camera 100 is shifted to the power-saving state as the second state, i.e. the automatic power-off state.

As described above, in the connection with the smartphone 150, when a connection request is received, and it is determined that the connection request source is a device to be continuously connected, the camera 100 is held in the second state. That is, if the camera 100 is shifted from the power-saving state to the normal operating state whenever a connection request is received, battery consumption is increased, and hence the camera 100 is held in the second state so as to suppress battery consumption. Particularly, in a case where it is desired to maintain a continuously connected state between the smartphone 150 and the camera 100, since the wireless connection is broken whenever the radio wave environment is degraded, and then the camera is operated each time for reconnection to the smartphone. This causes intense battery consumption. Therefore, to prevent such a situation, the camera 100 is held in the second state.

On the other hand, when the remote controller 101 and the camera 100 are wirelessly connected, the higher the response speed of the camera 100, the more convenient it is for the user. For this reason, when a connection request is received, and it is determined that the connection request source is not a device to be continuously connected, the camera 100 is immediately shifted from the power-saving state to the operating state. Since the camera 100 is shifted to the operating state before establishing the wireless connection, it is possible to reduce time after the wireless connection is established, which is taken from receipt of an operation command, such as a command for a release operation, to the start of the release operation of the camera 100.

Note that in the above-described example, the description is given of the case where the camera 100 establishes a connection to the remote controller 101 or the smartphone 150. The destination to which the camera 100 is to be connected is not limited to the remote controller 101 and the smartphone 150, but an accessory, such as a wireless strobe, a wireless microphone, and a wireless speaker, may be applied to a destination to which the camera 100 is to be connected.

As for these accessories, which of the same connection sequence as that for the remote controller 101 and the same connection sequence as that for the smartphone 150 is to be used is determined depending on control to be performed with respect to the camera and a connected state therebetween. For example, when wirelessly connecting the wireless speaker and the camera 100, it is unnecessary to change the state of the camera 100 from the wireless speaker, and hence, it is unnecessary to change the state of the camera 100 even after the wireless connection is established.

On the other hand, when the wireless strobe is connected to the camera 100, the strobe is sometimes operated to change the settings thereof. Therefore, when the wireless strobe is connected, it is necessary to notify the camera 100 of a change in the settings. For this reason, by changing the state of the camera 100 when the wireless connection is established, user-friendliness is improved. However, when the wireless strobe is in a shooting standby state, an operation command is transmitted from the camera 100 to the wireless strobe, and hence it is sometimes unnecessary to change the state of the camera 100.

As described above, also in each connection destination other than the remote controller 101 and the smartphone 150, whether or not to shift the camera 100 from the automatic power-off state is determined according to the function of the connection destination. This makes it possible to realize both of improvement in response of the camera 100 and suppression of power consumption.

Further, although in the above-described example, the connection destination is determined by the wireless communication section 102, e.g. in a case where the user limits the connection destination to a specified one or specified ones in advance, whether or not to shift the camera 100 from the automatic power-off state may be set when a wireless connection request is received. For example, in a case where the user limits the connection destination such that the camera 100 is connected only to the remote controller 101, upon receipt of a wireless connection request, the camera 100 is set to a remote controller connection mode in which it is shifted from the automatic power-off state.

Further, in a case where the user limits the connection destination such that the camera 100 is connected only to the smartphone 150, upon receipt of a wireless connection request, the camera 100 is set to a smartphone connection mode in which it is not shifted from the automatic power-off state. The user may set the remote controller connection mode or the smartphone connection mode by using a camera setting menu at a desired timing.

As described above, in the first embodiment of the present invention, the camera 100 determines a connection destination device according to a connection request from a wireless connection destination, and determines whether or not to change the state of the camera 100 from the automatic power-off state to the operating state according to a result of the determination. This makes it possible to realize both of improvement in response of the camera 100 and suppression of power consumption.

Next, a description will be given of a camera as a communication apparatus according to a second embodiment of the present invention. Note that the camera according to the second embodiment has the same configuration as that of the camera shown in FIGS. 1A, 1B, and 2A.

Figure 8:
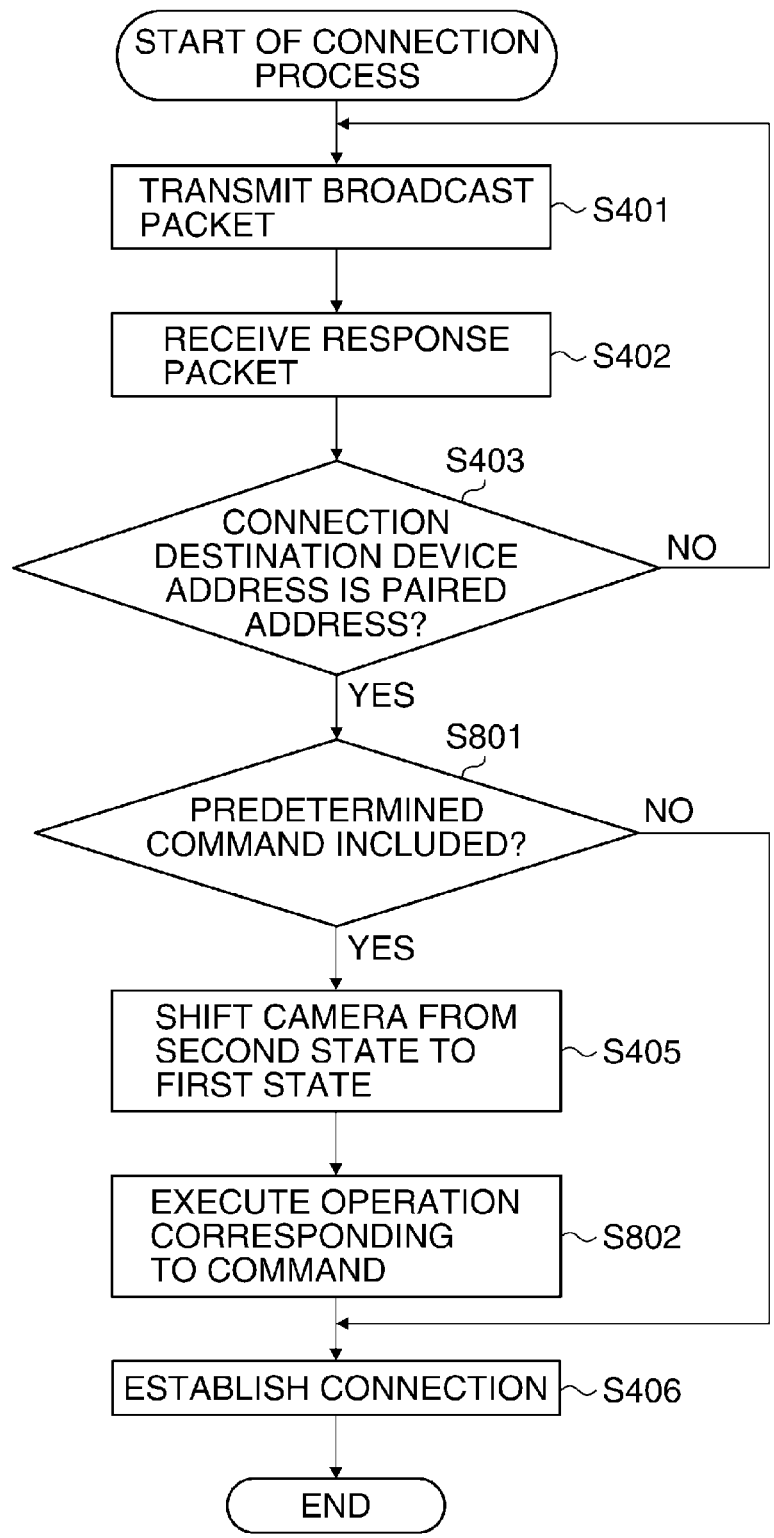
FIG. 8 is a flowchart of a wireless connection process for connecting between a digital camera as a communication apparatus according to a second embodiment of the present invention and a device as a connection destination.

FIG. 8 is a flowchart of a wireless connection process performed by the camera 100 as the communication apparatus according to the second embodiment, for connecting to a device as a connection destination. Note that the same processing steps in FIG. 8 as those of the wireless connection process in FIG. 4 are denoted by the same step numbers.

As described hereinabove, in the step S401, the camera 100 starts transmission of an advertising packet. In this state, for example, if one of the operation buttons is operated on the remote controller 101, the wireless communication IC/control microcomputer 254 thereof is activated, and detects the advertising packet. Then, the wireless communication IC/control microcomputer 254 transmits a wireless connection request (connect request) as a response packet. At this time, the wireless communication IC/control microcomputer 254 stores an operation command indicative of an operation performed on the remote controller 101, in the response packet.

The remote controller 101 is provided with the plurality of operation buttons, such as the release button, the AF button, and the zoom buttons, and the operation command indicating which button has been operated is transmitted to the camera 100 as described above. Although in general, this operation command is transmitted after a wireless connection is established, in the example described here, the operation command is transmitted before establishing the wireless connection.

The wireless communication packet shown in FIG. 6 is used as the response packet as mentioned above. In the example described here, not only the device address but also a command and command data (operation command) are added to the payload.

If it is determined by the device discrimination circuit 207 in the step S403 that the device address stored in the response packet is a paired device address, the process proceeds to a step S801. In the step S801, the device discrimination circuit 207 reads the operation command included in the response packet, and determines whether or not the operation command is a predetermined command.

If it is determined by the device discrimination circuit 207 in the step S801 that the operation command is a predetermined command, the main microcomputer/image processing engine 206 proceeds to the step S405, wherein the main microcomputer/image processing engine 206 shifts the camera 100 from the second state to the first state. Then, in a step S802, the main microcomputer/image processing engine 206 executes an operation corresponding to the operation command. After that, the main microcomputer/image processing engine 206 proceeds to the step S406, and establishes a wireless connection.

Note that the above-mentioned predetermined command is a command for operating the camera 100 in the first state, such as a release command, an AF command, and a command for changing the settings of the camera.

If it is determined by the device discrimination circuit 207 in the step S801 that the operation command is not a predetermined command, the main microcomputer/image processing engine 206 proceeds to the step S406, and establishes the wireless connection. Note that if the response packet does not include a command and command data, this indicates that a predetermined command is not included. Therefore, in this case, the main microcomputer/image processing engine 206 proceeds to the step S406, and establishes the wireless connection.

If the operation command is a release command for operating the release button, in the camera 100, shooting is started as soon as shooting preparation is completed, before establishing the wireless connection. As a result, it is possible to reduce a time period (approximately 100 msec) required to establish the wireless connection and a release time lag, whereby the operability is improved.

Further, if the operation command is an AF command for operating the AF button, in the camera 100, the AF operation is started before establishing the wireless connection. As a result, the AF operation is started earlier, whereby the operability of the remote controller 101 is improved.

Note that even if an operation corresponding to the operation command is not executed, by changing the state of the camera 100 according to a result of determination of whether or not a predetermined command is included, it is possible to prepare for a following operation. That is, it is possible to improve the operability.

Incidentally, in a wireless connection request (connect request), large-volume data sometimes cannot be transmitted. In this case, it is possible to transmit binary information indicative of whether or not an operation button is operated, by using 1 bit data. To discriminate which of the plurality of operation buttons has been operated, information indicative of which operation has been performed by using which operation button can be transmitted by using 1 byte data, only provided that the number of the operation buttons is eight at maximum.

As described above, in the second embodiment, the camera 100 determines whether or not a predetermined command is included in the connection request packet. Then, the camera 100 determines whether to perform wireless connection by shifting the camera from the power-saving state to the operating state or perform wireless connection without changing the state of the camera, according to a result of the determination. This makes it possible to realize both of reduction of power consumption and improvement in the operability of the camera.

Particularly, in the second embodiment, compared with the first embodiment, by pairing a wireless connection destination by the camera, a user is not required to register the device type in advance. Further, since it is unnecessary to discriminate the device type, the response speed is increased, whereby it is possible to improve the operability.

Next, a description will be given of a camera as a communication apparatus according to a third embodiment of the present invention. Note that the camera according to the third embodiment has the same configuration as that of the camera shown in FIGS. 1A, 1B, and 2A.

Figure 9:
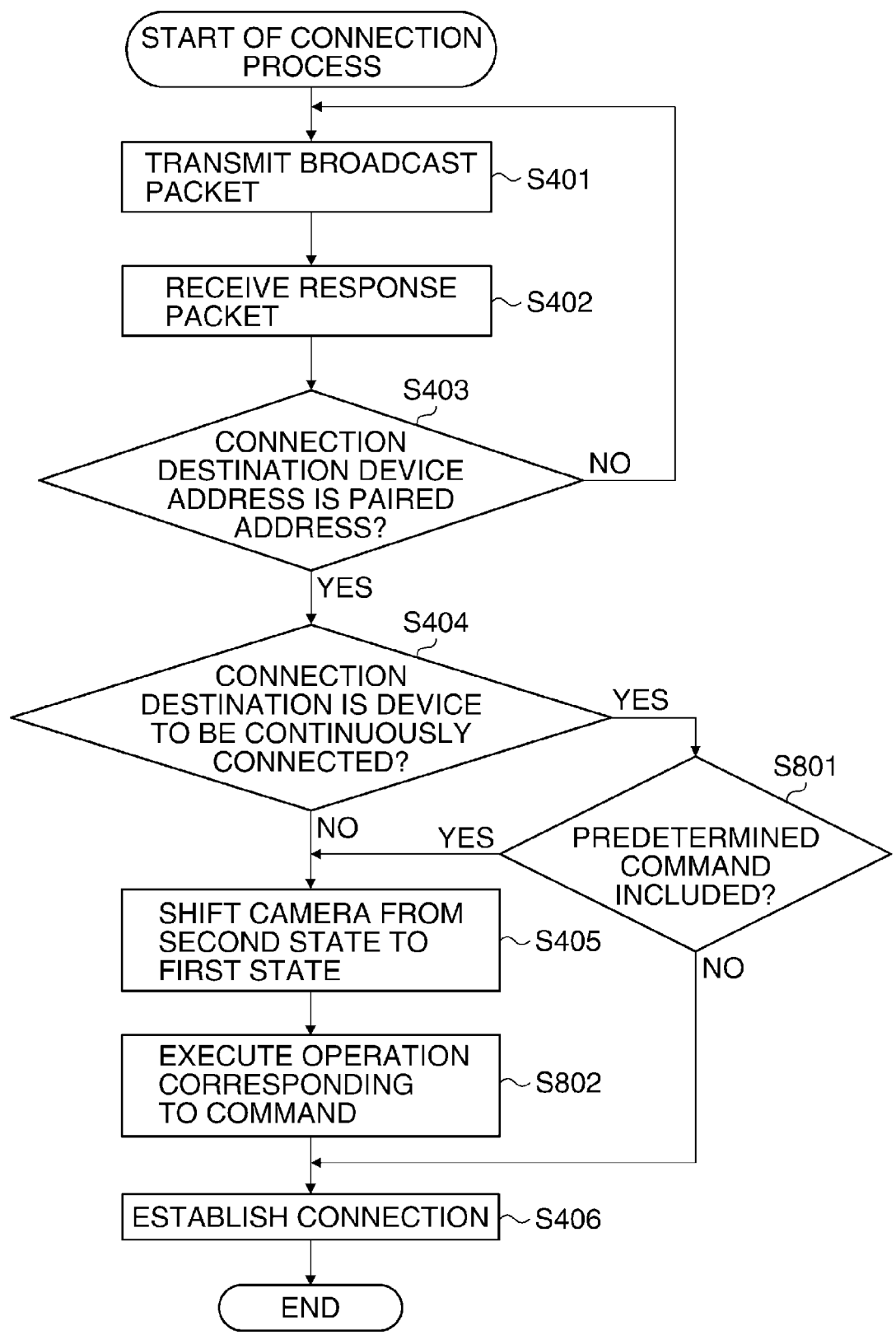
FIG. 9 is a flowchart of a wireless connection process for connecting between a digital camera as a communication apparatus according to a third embodiment of the present invention and a device as a connection destination.

FIG. 9 is a flowchart of a wireless connection process performed by the camera 100 as the communication apparatus according to the third embodiment, for connecting to a device as a connection destination. Note that the same processing steps in FIG. 9 as those of the wireless connection processes in FIGS. 4 and 8 are denoted by the same step numbers.

If it is determined by the device discrimination circuit 207 in the step S404 that the connection destination is a device to be continuously connected, the process proceeds to the step S801. If it is determined by the device discrimination circuit 207 in the step S801 that the operation command is a predetermined command, the main microcomputer/image processing engine 206 proceeds to the step S405, and shifts the camera 100 from the second state to the first state. Then, in the step S802, the main microcomputer/image processing engine 206 executes the operation corresponding to the operation command. After that, the main microcomputer/image processing engine 206 proceeds to the step S406, and establishes a wireless connection.

If it is determined by the device discrimination circuit 207 in the step S404 that the connection destination is not a device to be continuously connected, the main microcomputer/image processing engine 206 executes the step S405. After that, the main microcomputer/image processing engine 206 proceeds to the step S802, executes the operation corresponding to the operation command, and then establishes the wireless connection in the step S406.

If it is determined by the device discrimination circuit 207 in the step S801 that the operation command is not a predetermined command, the main microcomputer/image processing engine 206 proceeds to the step S406, and establishes the wireless connection.

Although in the illustrated example in FIG. 9, the determination in the step S801 is performed after the determination in the step S404, the process may be configured such that the determination in the step S801 is performed first, and then the determination in the step S404 is performed.

As described above, in the third embodiment, the type of the device of the connection destination is discriminated (i.e. determined), and whether or not a predetermined command is included is determined. Then, whether to make a wireless connection after changing the state of the camera from the power-saving state to the operating state or make a wireless connection without changing the state of the camera is decided according to a result of the discrimination (i.e. determination) of the device type and a result of the determination of presence of the command. That is, whether or not to change the state of the camera is determined using the two results of the determinations. This makes it possible to accurately change the state of the camera even if an error occurs in one of the determinations, and as a result, it is possible to prevent a situation in which the state of the camera is changed to the operating state and is then returned to the power-saving state again. Therefore, it is possible to prevent wasteful power consumption.

Next, a description will be given of a camera as a communication apparatus according to a fourth embodiment of the present invention. Note that the camera according to the fourth embodiment has the same configuration as that of the camera shown in FIGS. 1A, 1B, and 2A.

In the present embodiment, for example, the smartphone 150 is capable of switching the wireless connection setting between a setting for continuous connection of the smartphone 150 and a setting for non-continuous connection of the smartphone 150. For example, by installing a dedicated application in the smartphone 150, the smartphone 150 is switched by the dedicated application between the setting for continuous connection and the setting for non-continuous connection.

In this case, the camera 100 cannot determine only based on the device address of the smartphone 150 whether or not to continuously connect with the smartphone 150. Then, when transmitting a response packet, the smartphone 150 transmits setting information indicative of whether the smartphone 150 is set to the continuous connection or the non-continuous connection. Note that the smartphone 150 may transmit a predetermined operation command instead of transmitting the setting information.

Figure 10:
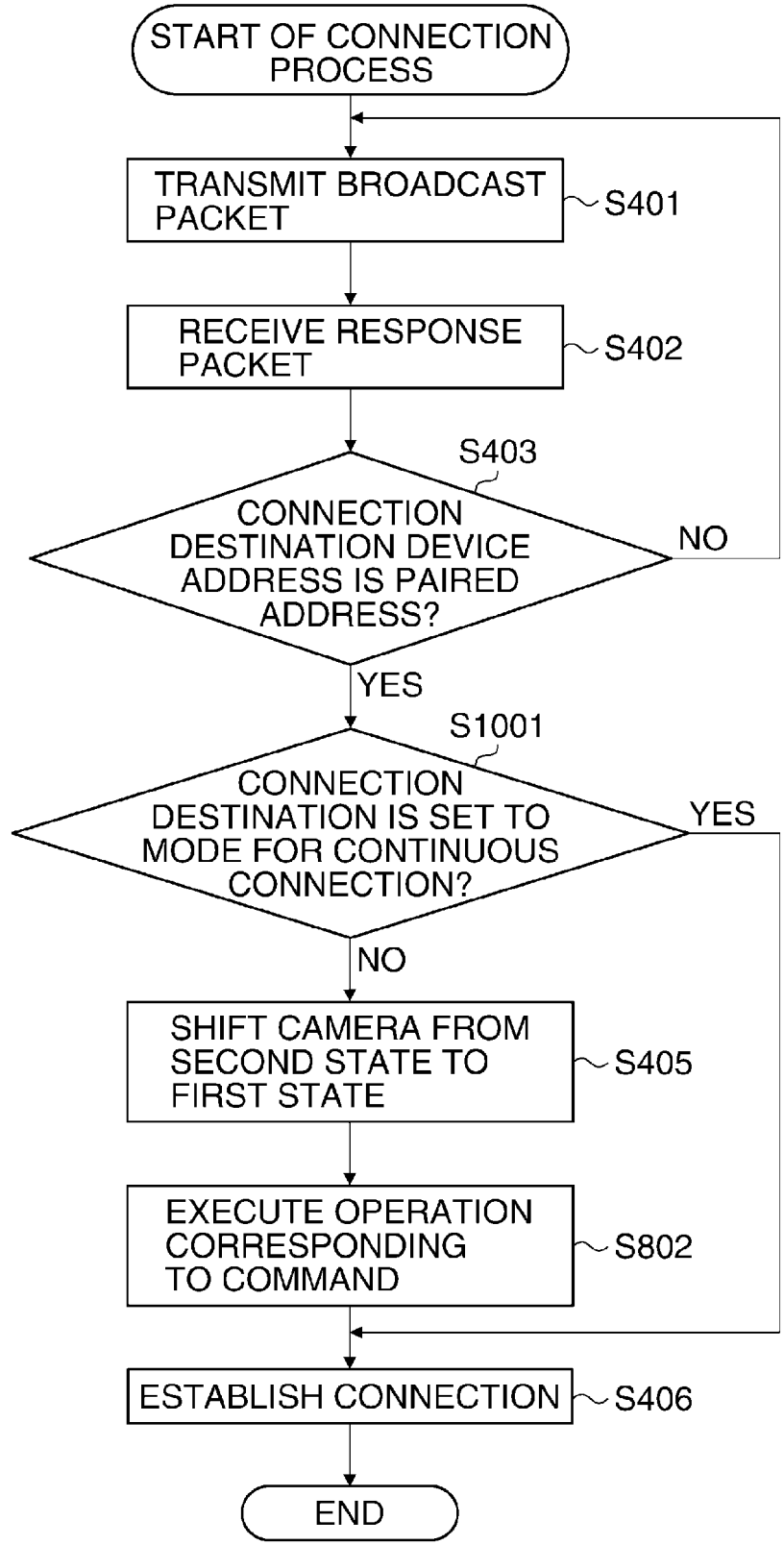
FIG. 10 is a flowchart of a wireless connection process for connecting between a digital camera as a communication apparatus according to a fourth embodiment of the present invention and a device as a connection destination.

FIG. 10 is a flowchart of a wireless connection process performed by the camera 100 as the communication apparatus according to the fourth embodiment, for connecting to a device as a connection destination. Note that the same processing steps in FIG. 10 as those of the wireless connection processes in FIGS. 4 and 8 are denoted by the same step numbers.

If it is determined by the device discrimination circuit 207 in the step S403 that the device address stored in the response packet is a paired device address, the process proceeds to a step S1001. In the step S1001, the device discrimination circuit 207 reads the setting information included in the response packet, and determines whether or not the connection destination has been set to a mode for continuous connection.

If it is determined by the device discrimination circuit 207 that the connection destination has been set to the mode for continuous connection, the main microcomputer/image processing engine 206 executes the step S406. On the other hand, if it is determined by the device discrimination circuit 207 that the connection destination has not been set to the mode for continuous connection, i.e. set to a mode for no-continuous connection, the main microcomputer/image processing engine 206 executes the step S405. Note that as described in the third embodiment, it is assumed that the response packet includes an operation command.

As described above, in the fourth embodiment, it is determined based on the setting information transmitted from the connection destination whether or not the connection setting of the connection destination is for continuous connection, and determines according to a result of the determination whether or not to shift the camera from the second state to the first state. Therefore, it is unnecessary for the camera 100 to determine whether or not to continuously connect with the connection destination, based on the device address of the connection destination.

As a result, even in a case where one connection destination can select between the continuous connection and the non-continuous connection, the camera 100 can determine whether or not to continuously connect with the connection destination. Therefore, to operate the camera 100 in the first state, it is possible to quickly shift the camera from the power-saving state to the operating state, and hence the operability is improved. Further, when it is desired to maintain the camera 100 in the power-saving state, the camera 100 is not shifted to the operating state, and hence it is possible to suppress battery consumption.

Next, a description will be given of a camera as a communication apparatus according to a fifth embodiment of the present invention. Note that the camera according to the fifth embodiment has the same configuration as that of the camera shown in FIGS. 1A, 1B, and 2A.

In the present embodiment, it is assumed that the camera 100 can select one of a plurality of connection modes. For example, the camera 100 can set one of the remote controller connection mode for connection with the remote controller 101 (non-continuous connection mode) and the continuous connection mode for connection with the smartphone 150, using a menu screen.

Figure 11:
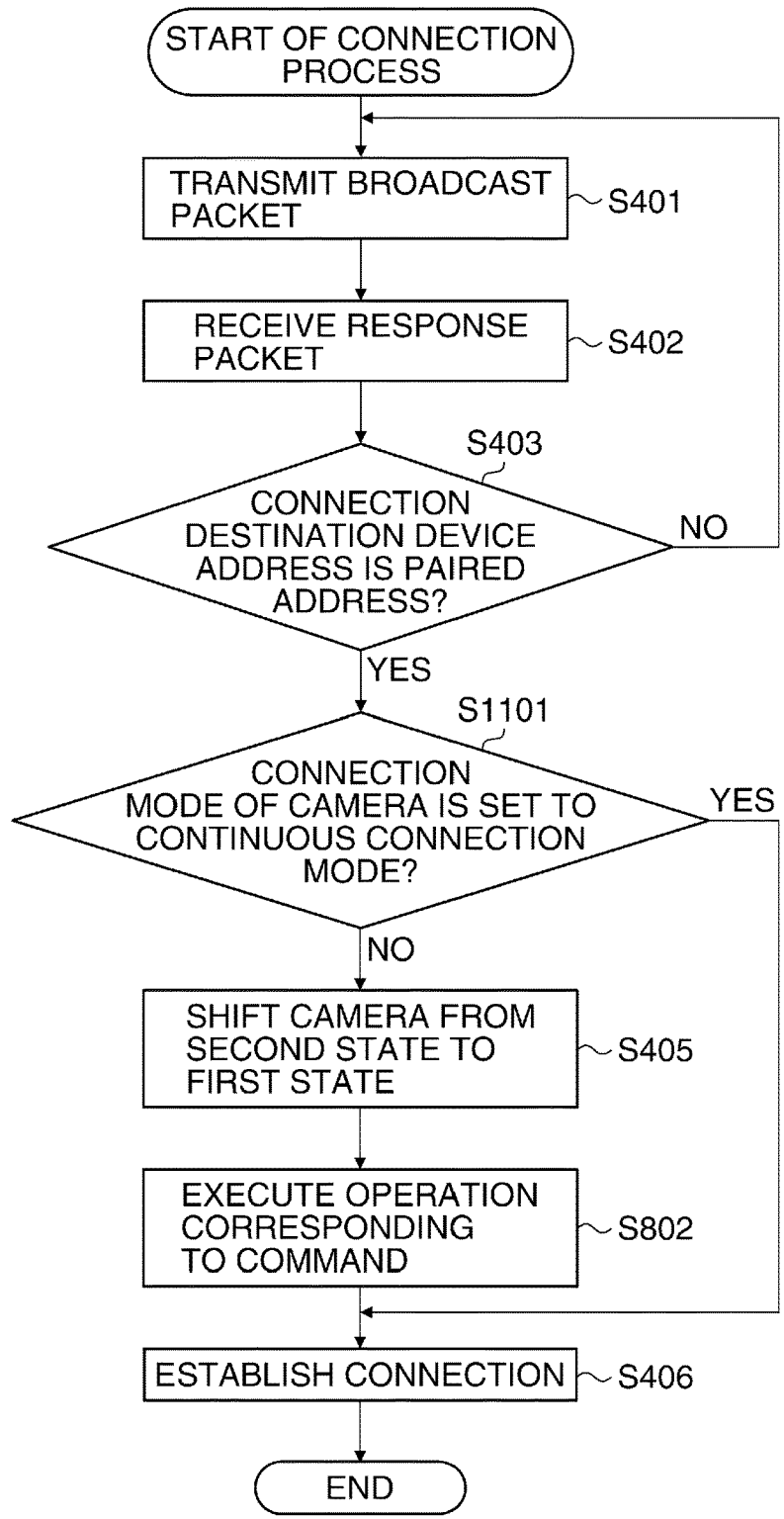
FIG. 11 is a flowchart of a wireless connection process for connecting between a digital camera as a communication apparatus according to a fifth embodiment of the present invention and a device as a connection destination.

FIG. 11 is a flowchart of a wireless connection process for connecting between the camera as the communication apparatus according to the fifth embodiment and a device as a connection destination. Note that the same processing steps in FIG. 11 as those of the wireless connection processes in FIGS. 4 and 8 are denoted by the same step numbers.

If it is determined by the device discrimination circuit 207 in the step S403 that the device address stored in the response packet is a paired device address, the process proceeds to a step S1101. In the step S1101, the main microcomputer/image processing engine 206 determines whether or not the connection mode of the camera has been set to the continuous connection mode.

If it is determined by the main microcomputer/image processing engine 206 that the connection mode (setting mode) of the camera 100 has been set to the continuous connection mode, the process proceeds to the step S406. On the other hand, if it is determined by the main microcomputer/image processing engine 206 that the connection mode of the camera 100 has not been set to the continuous connection mode, the process proceeds to the step S405. Note that as described in the third embodiment, it is assumed that the response packet includes an operation command.

As described above, in the fifth embodiment, whether to make a wireless connection after shifting the camera 100 from the power-saving state to the operating state or make a wireless connection without changing the state of the camera is determined based on the connection mode of the camera 100. Therefore, even if the connection mode or an operation command is not received from the connection destination, it is possible to determine whether or not to shift the camera 100 from the power-saving state to the operating state. That is, if the connection destination is a paired device, it is possible to change the state of the camera according to the connection mode, whereby it is possible to improve the response, and improve the operability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, a control method based on the functions of the above-described embodiments may be caused to be executed by the communication apparatus, such as an image pickup apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-121639 filed Jun. 20, 2016, which is hereby incorporated by reference herein in its entirety.

What is claimed is:

1. A communication apparatus comprising:
a communication unit configured to wirelessly communicate with one of a plurality of external devices including a first external device and a second external device, wherein the communication apparatus has been paired with each of the first external device and the second external device in advance; and
a control unit configured to have a first state for controlling the communication apparatus to a first predetermined state and a second state for controlling the communication apparatus to a second predetermined state in which power consumption of the communication apparatus is smaller than when the control unit is in the first state,
wherein, in the second state of the control unit, in a case where a connection request is received from one of the first external device and the second external device in response to broadcasting of an advertising packet by the communication apparatus, the communication apparatus is configured to:
read a device address of a transmission source of the connection request, which is included in the connection request, and perform a first determination to determine whether or not the read device address is a device address which was paired and registered in a memory of the communication apparatus in advance,
perform, if the read device address is determined as a paired and registered device address by the first determination, a second determination to determine whether to shift the state of the control unit from the second state to the first state,
shift the state of the control unit to the first state or maintain the state of the control unit in the second state according to a result of the second determination, and
establish a connection with the one of the first external device and the second external device, from which the connection request is received,
wherein the second determination is performed, based on whether the read device address is an address of the first external device or the second external device, and shifts the state of the control unit from the second state to the first state in a case where it is determined that the read device address is an address of the first external device.

2. The communication apparatus according to claim 1, wherein a state in which the connection is established is a state in which the communication apparatus and an external device each have a mating device address registered in each other, and have thereby mutually authenticated the connection therebetween.

3. The communication apparatus according to claim 1, wherein in the first state of the control unit, when a predetermined time period elapses in a state in which no operation is performed by a user, the control unit shifts to the second state.

4. The communication apparatus according to claim 1, wherein in a state in which the connection with the second external device is established when the control unit is in the second state, in a case where a predetermined command is received from the second external device via the communication unit, the control unit shifts to the first state.

5. The communication apparatus according to claim 4, further comprising an image pickup unit configured to pick up an image, and
wherein the predetermined command is a command for causing the image pickup unit to perform image pickup.

6. The communication apparatus according to claim 1, wherein the wireless communication is BLE (Bluetooth Low Energy).

7. The communication apparatus according to claim 1, wherein the first external device is a remote controller, and the second external device is a smartphone.

8. The communication apparatus according to claim 1, further comprising a power supply that is connected to the control unit.

9. The communication apparatus according to claim 1, wherein in the second state of the control unit, even in a case where a connection request is received from the first external device via the communication unit, when a predetermined command is not included in the connection request, the control unit is configured to maintain the second state.

10. A method of controlling a communication apparatus including a communication unit configured to wirelessly communicate with one of a plurality of external devices including a first external device and a second external device, wherein the communication apparatus has been paired with each of the first external device and the second external device in advance, and a control unit configured to have a first state for controlling the communication apparatus to a first predetermined state and a second state for controlling the communication apparatus to a second predetermined state in which power consumption of the communication apparatus is smaller than when the control unit is in the first state,
the method comprising, in the second state of the control unit, in a case where a connection request is received from one of the first external device and the second external device in response to broadcasting of an advertising packet by the communication apparatus:
reading a device address of a transmission source of the connection request, which is included in the connection request, and performing a first determination to determine whether or not the read device address is a device address which was paired and registered in a memory of the communication apparatus in advance,
performing, if the read device address is determined as a paired and registered device address by the first determination, a second determination to determine whether to shift the state of the control unit from the second state to the first state, shifting the state of the control unit to the first state or maintaining the state of the control unit in the second state according to a result of the second determination, and establishing a connection with the one of the first external device and the second external device, from which the connection request is received, wherein the second determination is performed, based on whether the read device address is an address of the first external device or the second external device, and shifts the state of the control unit from the second state to the first state in a case where it is determined that the read device address is an address of the first external device.

11. A non-transitory computer-readable storage medium storing a computer-executable program for executing a method of controlling a communication apparatus including a communication unit configured to wirelessly communicate with one of a plurality of external devices including a first external device and a second external device, wherein the communication apparatus has been paired with each of the first external device and the second external device in advance, and a control unit configured to have a first state for controlling the communication apparatus to a first predetermined state and a second state for controlling the communication apparatus to a second predetermined state in which power consumption of the communication apparatus is smaller than when the control unit is in the first state, wherein the method comprises, in the second state of the control unit, in a case where a connection request is received from one of the first external device and the second external device in response to broadcasting of an advertising packet by the communication apparatus:

reading a device address of a transmission source of the connection request, which is included in the connection request, and performing a first determination to determine whether or not the read device address is a device address which was paired and registered in a memory of the communication apparatus in advance, performing, if the read device address is determined as a paired and registered device address by the first determination, a second determination to determine whether to shift the state of the control unit from the second state to the first state, shifting the state of the control unit to the first state or maintaining the state of the control unit in the second state according to a result of the second determination, and establishing a connection with the one of the first external device and the second external device, from which the connection request is received, wherein the second determination is performed, based on whether the read device address is an address of the first external device or the second external device, and shifts the state of the control unit from the second state to the first state in a case where it is determined that the read device address is an address of the first external device.

* * * * *